JOHN C. WHITE.

Rolling Seams of Boots and Shoes.

No. 4,805. Reissued March 12, 1872.

Witnesses.

Jno. D. Patten.

A. Moor

Inventor.

John C. White by Munn & Co

Att'ys

AM. PHOTO-LITHOGRAPHIC CO. N.Y. (OSBORNE'S PROCESS.)

UNITED STATES PATENT OFFICE.

JOHN C. WHITE, OF AUBURN, NEW YORK, ASSIGNOR, BY MESNE ASSIGNMENTS, TO ALLEN W. THOMAS.

IMPROVEMENT IN APPARATUS FOR ROLLING BOOT AND SHOE SEAMS.

Specification forming part of Letters Patent No. 39,515, dated August 11, 1863; reissue No. 4,805, dated March 12, 1872.

Specification describing a new and Improved Machine for Rolling the Seams of Boots and Shoes, invented by JOHN C. WHITE, of Auburn, in the county of Cayuga and State of New York.

Figure 1:
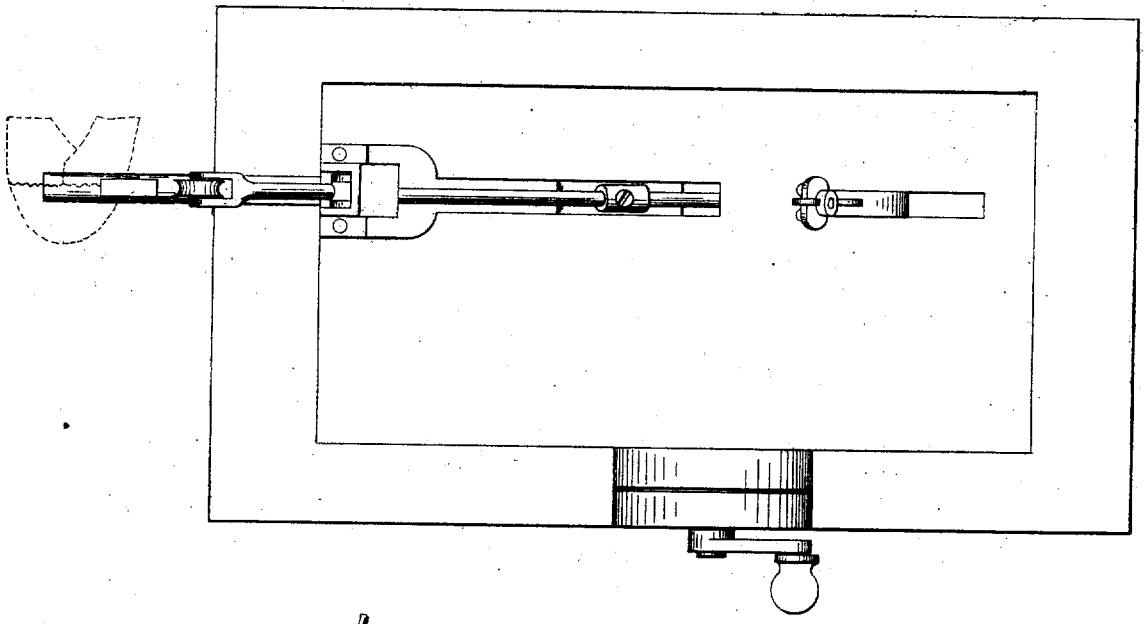
Figure 2:
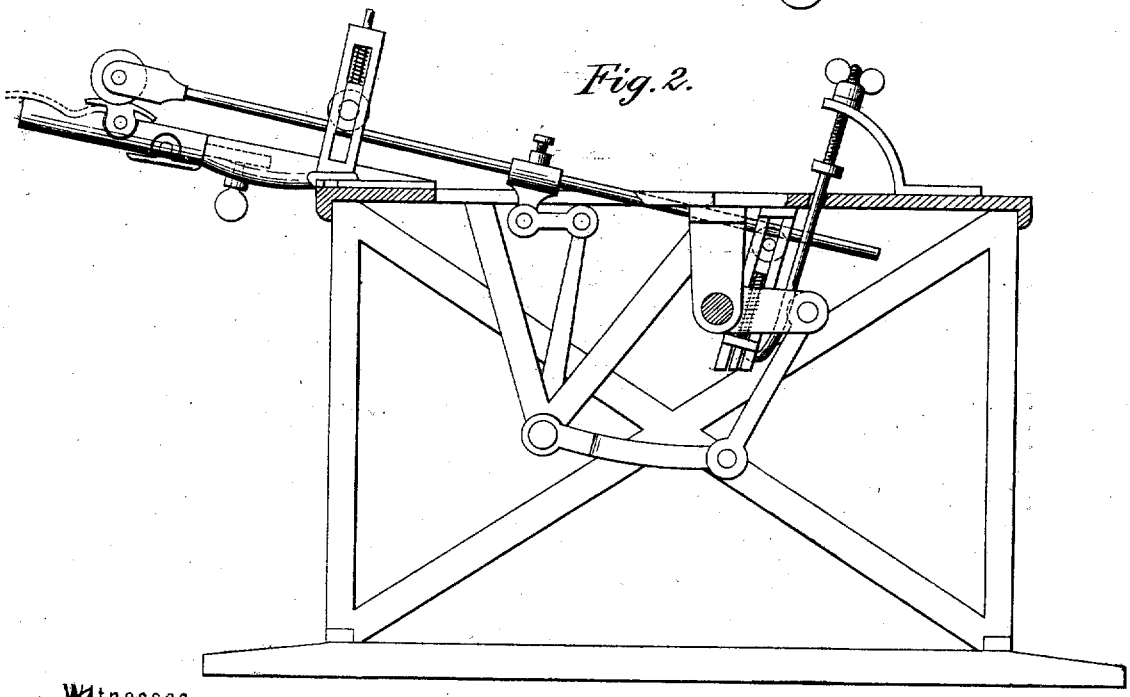

Figure 1 represents a plan or top view of my invention. Fig. 2 is a longitudinal vertical section of the same.

Similar letters of reference indicate corresponding parts.

In the manufacture of boots and shoes, particularly of leather or morocco, it is essential, in order to produce good work, to rub the seams well down on the inner side. Until the production of my improved mechanism this operation has been performed entirely by hand by means of the ordinary rubbing instrument, with great exertion and loss of time.

The object of this invention is to perform the operation of rubbing down or rolling the seams by machinery capable of being driven by any suitable power; and the invention consists in the use of a roller for smoothing and finishing seams, in combination with any suitable form of bed or support for the material to be rolled, and connected, by means of a rod or arm, with mechanism from which it receives the necessary reciprocating movements. The invention also consists in the combination of a reciprocating-roller with a rotary-shaft and reversible bed or support for the material to be rolled. The invention also consists in the use of springs, in combination with the rod or bar carrying the finishing-roller, whereby the pressure of the same is rendered elastic and may be regulated as desired. The invention likewise comprises a swivel-clamp for holding the material to be treated, and certain other features or devices, under an arrangement hereinafter described in a general way, and also specifically indicated in the claims.

In the drawing, A represents a frame, of metal or other suitable material, which is supported by legs B, and which forms the bearings for a shaft, C, to which a rotary motion is imparted by a belt running on the pulley D, or by any other suitable means. The shaft C carries a crank, *a*, which connects, by a rod, *b*, and arm *c*, with a rock-shaft, *d*, and this rock-shaft connects, by an arm, *e*, and link *f*, with a sleeve, *g*, which is adjustable by means of a set-screw, *h*, on the roller-arm E. The outer end of this arm is forked, and forms the bearings for the axle of a grooved roller, *i*, which travels on the bed F. The rear or inner end of said roller-arm is supported by a grooved roller, J, the shaft of which has its bearings on boxes *k* that slide up and down in slotted standards *l* suspended from the frame A. The boxes *k* are exposed to the action of springs *m*, the tension of which can be regulated by a screw-rod, *m'*, and nut *m''*. Another roller, *n*, is attached to an axle which has its bearings in boxes $n^1$ that slide up and down in slotted standards $n^2$ rising from the frame A, and said boxes are exposed to the action of springs $n^3$.

The roller *n* acts on the top of the grooved roller *i* in the outer end of the roller-arm, and by referring to Fig. 2 of the drawing it will be readily understood how, by raising the roller *j* supporting the inner end of the roller-arm, the outer end or grooved roller *i* is depressed on the bed F, and, by lowering the roller *j*, the pressure exerted by the grooved roller on the bed is diminished.

The bed F consists of a metal bar, the surface of which is rounded, and which extends, in an upwardly-inclined direction, from the end of the frame A. The inclination of said bed is steeper than that of the roller-arm E, so that the grooved roller rises gradually as the arm advances; and when said roller has reached its extreme position the arm E is parallel with the bed. The bed F is made of two parts, *o o'*, the inner part *o* being rigidly attached to the frame A, and forming a socket for the outer part *o'*, so that said outer part can be turned in the inner part to allow either of its surfaces to be brought under the roller *i*. It is secured in the desired position by a set-screw, *p*, and provided with two swivel-clamps, *q*, one on each surface, to hold the leather or other material to be rolled. These swivel-clamps are intended to stand just high enough to admit the seam of a boot or shoe, and they hold the work and prevent the grooved roller from striking the same too suddenly. One surface of the outer part of the bed F is straight and the other curved to correspond to the shape of different seams. To accommodate a great variety of seams pieces of different shapes are substituted for the removable bed *o*.

Having thus described my invention, what I claim as new, and desire to secure by Letters Patent, is—

1. A roller, *i*, carried by an arm or rod connected with mechanism from which it receives reciprocating movements, in combination with a suitable bed or support for the material to be rolled or rubbed, substantially as described.

2. In a machine for rolling and rubbing down seams, I claim the combination of the roller *i*, arm E, reversible bed F, and suitable operating mechanism, substantially as shown and described.

3. In a machine for rolling and rubbing down seams, the combination of a spring-bearing with the arm carrying the roller, substantially as shown and described.

4. The combination of the shaft C, arm *a*, link *b*, shaft *d*, arms *c e*, link *f*, clamp device *g h*, rod E, spring-rollers *j n*, roller *i*, and a bed or support for the material to be rolled, substantially as specified.

5. The arrangement of the adjustable spring-supported roller *j* and spring-roller *n* with the roller-arm E and bed F, constructed and operating substantially as and for the purpose set forth.

6. The outer part *o'* of the bed F, made adjustable by a set-screw, *p*, or other equivalent means, as and for the purpose described.

7. The swivel-clamp *q*, in combination with a bed for supporting material to be rolled, when constructed and operating in the manner and for the purpose described.

JOHN C. WHITE.

Witnesses:
W. P. ROBINSON,
CALVIN N. SITTSER.